(12) United States Patent
Rose

(10) Patent No.: US 9,216,822 B1
(45) Date of Patent: Dec. 22, 2015

(54) HELIUM ASSISTED AERIAL RECREATIONAL DEVICE SYSTEMS

(71) Applicant: Selbourne Rose, Jamaica Queens, NY (US)

(72) Inventor: Selbourne Rose, Jamaica Queens, NY (US)

(*) Notice: Subject to any disclaimer, the term of this patent is extended or adjusted under 35 U.S.C. 154(b) by 2 days.

(21) Appl. No.: 14/445,489

(22) Filed: Jul. 29, 2014

Related U.S. Application Data

(60) Provisional application No. 61/859,713, filed on Jul. 29, 2013.

(51) Int. Cl.
  *B64C 31/06* (2006.01)
  *A63H 27/08* (2006.01)
  *B64B 1/00* (2006.01)

(52) U.S. Cl.
  CPC . *B64C 31/06* (2013.01); *B64B 1/00* (2013.01); *A63H 27/085* (2013.01); *B64B 2201/00* (2013.01); *B64C 2031/065* (2013.01)

(58) Field of Classification Search
  CPC ............. B64C 31/06; B64C 2031/065; A63H 27/085; A63H 27/08
  See application file for complete search history.

(56) References Cited

U.S. PATENT DOCUMENTS

| | | | | |
|---|---|---|---|---|
| 2,208,786 A | * | 7/1940 | Astle | A63H 27/085 244/153 R |
| 2,486,158 A | * | 10/1949 | Haas | A63H 27/085 116/210 |
| 2,769,605 A | * | 11/1956 | Sparkman | A63H 27/085 244/153 R |
| 3,952,975 A | | 4/1976 | Laske | |
| 4,129,272 A | * | 12/1978 | Jones | B64C 31/036 244/145 |
| 5,762,293 A | | 6/1998 | Crosbie | |
| 2006/0163433 A1 | | 7/2006 | Beckingham et al. | |

* cited by examiner

*Primary Examiner* — Tien Dinh
*Assistant Examiner* — Richard R Green
(74) *Attorney, Agent, or Firm* — RG Patent Consulting, LLC; Rachel Gilboy

(57) ABSTRACT

A helium assisted kite system is a kite having an inflatable gas chamber that is attached to the perimeter of the kite cover fabric and outlines its shape. The cover fabric has at least one sleeve that a perimeter rail slides into to provide rigidity and shape to the kite. A frame having a spine, a top spreader, and a bottom spreader are attached to the cover fabric by a series of nocks. The inflatable gas chamber is filled with helium which provides lift for the kite on windless days and is able to lift the kite to a height where it reaches the higher elevation winds.

18 Claims, 5 Drawing Sheets

HELIUM ASSISTED AERIAL RECREATIONAL DEVICE SYSTEMS

CROSS-REFERENCE TO RELATED APPLICATION

The present application is related to and claims priority from prior provisional application Ser. No. 61/859,713, filed Jul. 29, 2013 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

FIELD OF THE INVENTION

The present invention relates generally to the field of inflatable kites and more specifically relates to helium assisted kite systems.

DESCRIPTION OF THE RELATED ART

Kites are known to have been in use for at least two thousand years and in various countries. Early uses were mostly for cultural purposes but later were used for scientific and military purposes. Since kite flying has become recreationally popular in this century, many shapes and colors of kites have been designed and flown. One thing that all kites have had in common since the origin of kites is that a wind is necessary for the kite to be able to fly. The kite-string pulls the kite against the wind, and the kite rises: but only if there is a sufficient breeze for it to rise against.

Kites rely on the resistive force of the wind to lift them into the air. On windless days, other forms of recreation must be chosen. Depending on geographic location, it could be months before a kite could be flown. Often, at higher elevations there are winds present, when there is only still air close to ground level. A kite would have to get above the bottom strata of still air to catch the upper winds in order to fly. An inexpensive solution that could get a kite to rise to catch the upper winds would be welcomed; then kite flying would not just be seasonal or so strongly dependant on current weather conditions.

Various attempts have been made to solve the above-mentioned problems such as those found in U.S. Pat. No. 3,952,975 to Louis Lawrence Laske; U.S. Pat. No. 5,762,293 to Scott C. Crosbie; and U.S. Publication No. 2006/0163433 to William J. Beckingham et al. This art is representative of inflatable kites. None of the above inventions and patents, taken either singly or in combination, is seen to describe the invention as claimed.

Ideally, an inflatable kite should provide lift even in the absence of wind being present while visually minimizing the appearance of the gas channel by incorporating it into the design, and yet, would operate reliably and be manufactured at a modest expense. Thus, a need exists for a reliable helium assisted kite system to avoid the above-mentioned problems.

BRIEF SUMMARY OF THE INVENTION

In view of the foregoing disadvantages inherent in the known inflatable kite art, the present invention provides a novel helium assisted kite system. The general purpose of the present invention, which will be described subsequently in greater detail, is to provide lift even when no wind is present while visually minimizing the appearance of the gas channel by incorporating it into the design.

The present invention, helium assisted kite systems, as disclosed herein preferably comprises a kite assembly having a cover fabric, a plurality of nocks, a tubular gas chamber, a frame comprising a spine, a bottom spreader, a top spreader, and a perimeter rail, a bridle, a tow point, a tail and a flight string. The cover fabric, the tubular gas chamber, the frame, the tail, and the bridle in combination are functionally operable to ascend into the upper wind currents for recreational purposes, as well as other suitable purposes. The kite assembly is structured to rise into the atmosphere either by the wind or when no wind is present in proximity to the ground, to rise via the helium filled tubular gas chamber. The length, the width and the height of the kite assembly is defined by the size of the frame and the cover fabric. The cover fabric envelopes and attaches to the frame, the frame providing rigidity to the cover fabric such that the cover fabric remains in a stretched planar position when assembled in a ready for use condition. The bottom spreader is deposed parallel to the top spreader and the spine is deposed perpendicular to the bottom spreader and the top spreader. The spine of the frame is positioned vertically on the assembled kite assembly during proper flight.

The perimeter rail is attached about the perimeter of the cover fabric and is structured and arranged to provide shape for the cover fabric in a stretched out planar position. The border of the kite assembly comprises a sleeve that is structured to receive the perimeter rail. The perimeter rail preferably is semi-rigid and may be curved in some embodiments. The particular shape or theme of the kite is not of the essence, but rather, the tubular gas chamber that attaches to the perimeter of the cover fabric, whatever shape or theme the kite embodiment is. The tubular gas chamber may be of such a cross-sectional diameter as to contain enough helium gas to offset the gravitational pull and allow the kite assembly to become airborne. The diameter may vary according to size and weight of the materials of the kite assembly.

As seen from a ground view point, the kite may resemble a heart, or have a geometric shape, or even of an animal or fantasy figure. The tubular gas chamber attached to the perimeter of the cover fabric provides the novelty. The tubular gas chamber is non-removably attached about the perimeter of the cover fabric such that it comprises substantially the same shape as the cover fabric when the kite assembly is in a stretched planar position. The tubular gas chamber may form a full perimeter border for the cover fabric, or may only form a partial perimeter for the cover fabric and be constructed of a non-permeable fabric so that it is able to contain a gas such as helium. The tubular gas chamber has an inner volume that is an inflatable gas channel sufficiently sized to contain enough helium to overcome the gravitational pull and promote a lifting action upon the kite assembly.

The tubular gas chamber functions not only as a lifting means, but in some embodiments, may also function as a perimeter rail. The tubular gas chamber may also function as the frame or part of the frame in some embodiments, such as the spine, the top spreader, the bottom spreader, or the perimeter rail depending on the size and shape of the cover fabric. Larger embodiments preferably use the full frame. The kite assembly comprises light weight materials such that the diameter of the tubular gas chamber is able to be comparatively small to the cover fabric and the frame so that the image of the kite is able to be maintained.

The tubular gas chamber has a fill-valve that is structured to fill the tubular gas chamber with helium via the fill-valve to render the kite assembly lighter than air. The fill-valve is able to confine the helium within the tubular gas chamber and alternately to exhaust the helium from the tubular gas chamber quickly when a completely collapsed condition is desired for storage.

The nocks may be attached to the perimeter of the cover fabric such that the spine, the bottom spreader, the top spreader, and the perimeter rail are able to be attached to the cover fabric in the stretched planar position. The nocks may be small, plastic brackets with cylindrical recesses that the ends of the frame parts slide into, or may be string loops that slotted ends of each frame part slides onto. The tow point of the bridle is located at a center of the bridle and comprises a point for attaching the flight string. The flight string is a tether between the kite assembly and the user such that the kite assembly is able to be lifted into the atmosphere against the wind by the resistance of the user holding the flight string, and sailed to a user preferred height by the amount of flight string unreeled from the spool. The bridle is attached to at least two points on the perimeter edge of the kite assembly, and may be attached to more points in some embodiments that are larger or of a more complex design. The bridle is attached at balance points such that the flight of the kite assembly is able to remain substantially stabile and in a controlled user preferred position.

The tail of the kite assembly is located at the bottom end of the kite assembly and may be attached to the lowermost end of the spine if the tail is not integral with the cover fabric. In some embodiments, the tail is integral with the cover fabric instead of separate. The tail provides additional flight stabilization for the kite assembly. This kite assembly is useful for attaching the flight string to the tow point and allowing the helium filled tubular gas chamber to lift the kite assembly upward above the ground surface into a higher elevation wind on days when no wind is present at the ground surface.

A kit is embodied herein for the helium assisted kite system preferably comprising at least one cover fabric having a plurality of nocks and a tubular gas chamber, at least one frame comprising a spine, a top spreader, a bottom spreader, and a perimeter rail, at least one tail, at least one bridle having a tow point, at least one spool of flight string, and at least one set of assembly instructions.

In accordance with the embodiments of the present invention a preferred method of use is disclosed herein preferably comprising the steps of assembling the kite assembly, holding said kite assembly upward at arm's length in the outside air, allowing the kite assembly to rise via the helium filled tubular gas chamber into the wind, releasing slack on the spool of flight string to gain a desired kite elevation, flying the kite assembly, retracting the kite assembly via the flight string, disassembling the kite assembly, and storing the kite assembly.

The present invention holds significant improvements and serves as a helium assisted kite system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, helium assisted kite system, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a inflatable kites and more particularly to a helium assisted kite system as used to improve the lift even despite times when wind is not present (at ground level) while visually minimizing the appearance of the gas channel by incorporating it into the design.

Generally speaking, the helium assisted kite system is a kite having an inflatable gas chamber that is attached to the perimeter of the kite cover fabric which outlines its shape. The cover fabric may have at least one sleeve that a perimeter rail slides into to provide rigidity and shape to the kite. A frame having a spine, a top spreader, and a bottom spreader are attached to the cover fabric by a series of nocks. The inflatable gas chamber is filled with helium which provides lift for the kite on windless days and is able to lift the kite to a height where it reaches the higher elevation winds.

Figure 1:
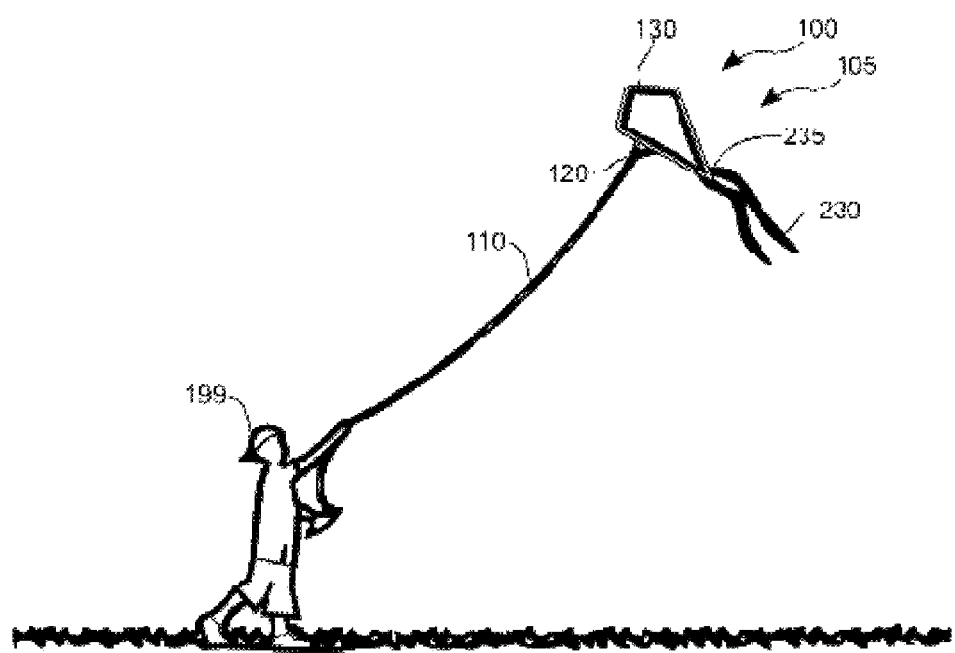
FIG. 1 shows a perspective view illustrating an in-use condition of a helium assisted kite system according to an embodiment of the present invention.

Referring to the drawings by numerals of reference there is shown in FIG. 1, a perspective view illustrating an in-use condition of helium assisted kite system 100 according to an embodiment of the present invention.

Helium assisted kite system 100 comprises kite assembly 105. Kite assembly 105 is useful for attaching flight string 110 to tow point 120 and allowing helium filled tubular gas chamber 130 to lift kite assembly 105 upward above the ground surface into a higher elevation wind on days when no wind is present at the ground surface. Kite assembly 105 is structured to rise into the atmosphere either by wind or when no wind is present in proximity to the ground surface, to rise via the helium filled tubular gas chamber 130. The particular shape or theme of kite assembly 105 is not of essence, but rather, tubular gas chamber 130 that attaches to perimeter 150 of cover fabric 140, whatever the shape or theme of kite assembly 105 is.

As seen from a ground view point, kite assembly 105 may resemble a heart, or have a geometric shape, or even the shape of an animal or fantasy figure. Tubular gas chamber 130 attached to perimeter 150 of cover fabric 140 provides the intended novelty though. A unique theme or shape may also provide the novelty in addition to the tubular gas chamber(s). Tubular gas chamber 130 is non-removably attached about perimeter 150 of cover fabric 140 such that tubular gas chamber 130 comprises substantially the same shape as cover fabric 140 when kite assembly 105 is in a stretched planar position.

Tubular gas chamber 130 may form a full perimeter 150 border for cover fabric, or may only form a partial perimeter 150 of cover fabric 140 and be constructed of a non-permeable fabric so that it is able to contain a gas such as helium. Flight string 110 is a tether between kite assembly 105 and user 199 such that kite assembly 105 is able to be lifted into the atmosphere against the wind by resistance of user 199 holding flight string 110 allowing the wind to push kite assembly 105 upward, and sailed to a user preferred height by the amount of flight string 110 unreeled from the spool.

Figure 2:
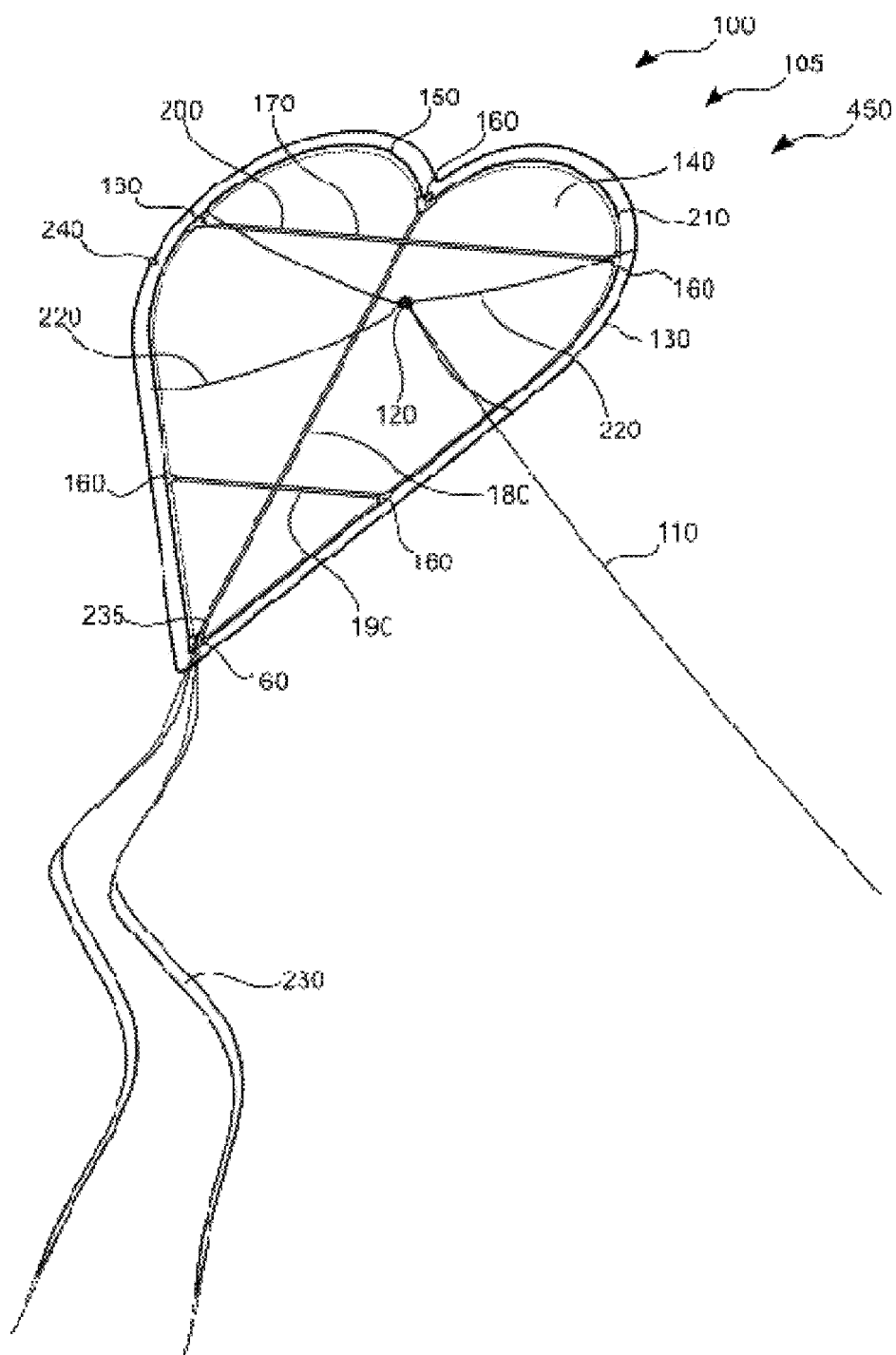
FIG. 2 is a perspective view illustrating the helium assisted kite system according to an embodiment of the present invention of FIG. 1.

Referring now to FIG. 2, a perspective view illustrating helium assisted kite system 100 according to an embodiment of the present invention of FIG. 1.

Helium assisted kite system 100 preferably comprises kite assembly 105 having cover fabric 140, a plurality of nocks 160, tubular gas chamber 130, frame 170 comprising spine 180, bottom spreader 190, top spreader 200, and perimeter rail 210, bridle 220, tow point 120, tail 230 and flight string 110. Cover fabric 140, tubular gas chamber 130, frame 170, tail 230, and bridle 220 in combination are functionally operable. The length, width and height of kite assembly 105 is defined by the size of frame 170 and cover fabric 140. Bridle 220 is attached to at least two points on perimeter 150 edge of kite assembly 105, and attached to more points in some embodiments that are of a larger or of a more complex design. Bridle 220 is attached at balancing points so the flight of kite assembly 105 is able to remain substantially stabile and in a controlled user 199 preferred position. Tail 230 of kite assembly 105 is located at bottom end 235 of kite assembly 105 and may be attached to the lowermost end of spine 180 if tail 230 is not integral with cover fabric 140. In some embodiments, tail 230 is integral with cover fabric 140 instead of separate. Tail 230 provides additional flight stabilization for kite assembly 105.

Figure 3:
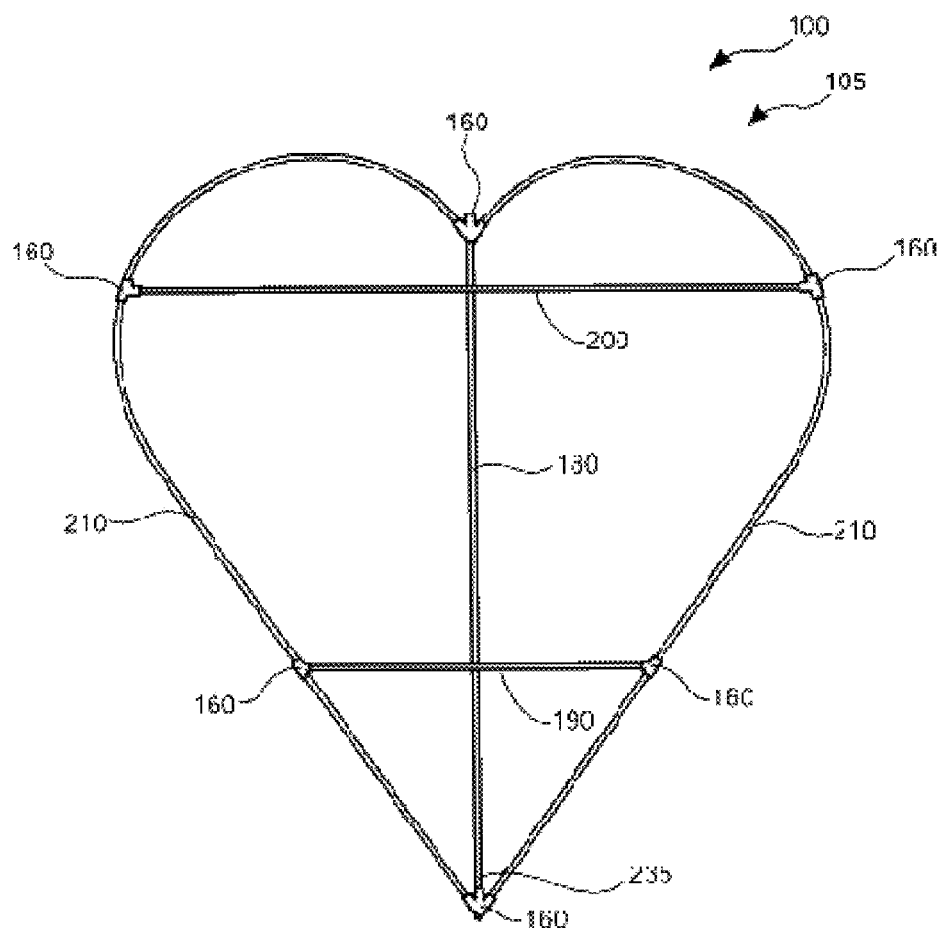
FIG. 3 is a perspective view illustrating a frame of the helium assisted kite system according to an embodiment of the present invention of FIG. 1.

Referring now to FIG. 3, a perspective view illustrating a frame of helium assisted kite system 100 according to an embodiment of the present invention of FIG. 1.

Cover fabric 140 envelopes and attaches to frame 170 providing rigidity to cover fabric 140 such that cover fabric 140 remains in a stretched planar position when assembled into the ready for use condition. Bottom spreader 190 is deposed parallel to top spreader 200 and spine 180 is deposed perpendicular to bottom spreader 190 and top spreader 200. Spine 180 of frame 170 is positioned vertically on the assembled kite assembly 105 during proper flight. Nocks 160 may be attached to perimeter 150 of cover fabric 140 such that spine 180, bottom spreader 190, top spreader 200, and perimeter rail 210 are able to be attached to cover fabric 140 in the stretched planar position. Nocks 160 may be small, plastic brackets with cylindrical recesses that the ends of frame 170 sections slide into, or may be string loops that slotted ends of frame 170 slide onto. Tow point 120 of bridle 220 is located at a center of bridle 220 and comprises a point for attaching flight string 110.

Figure 4:
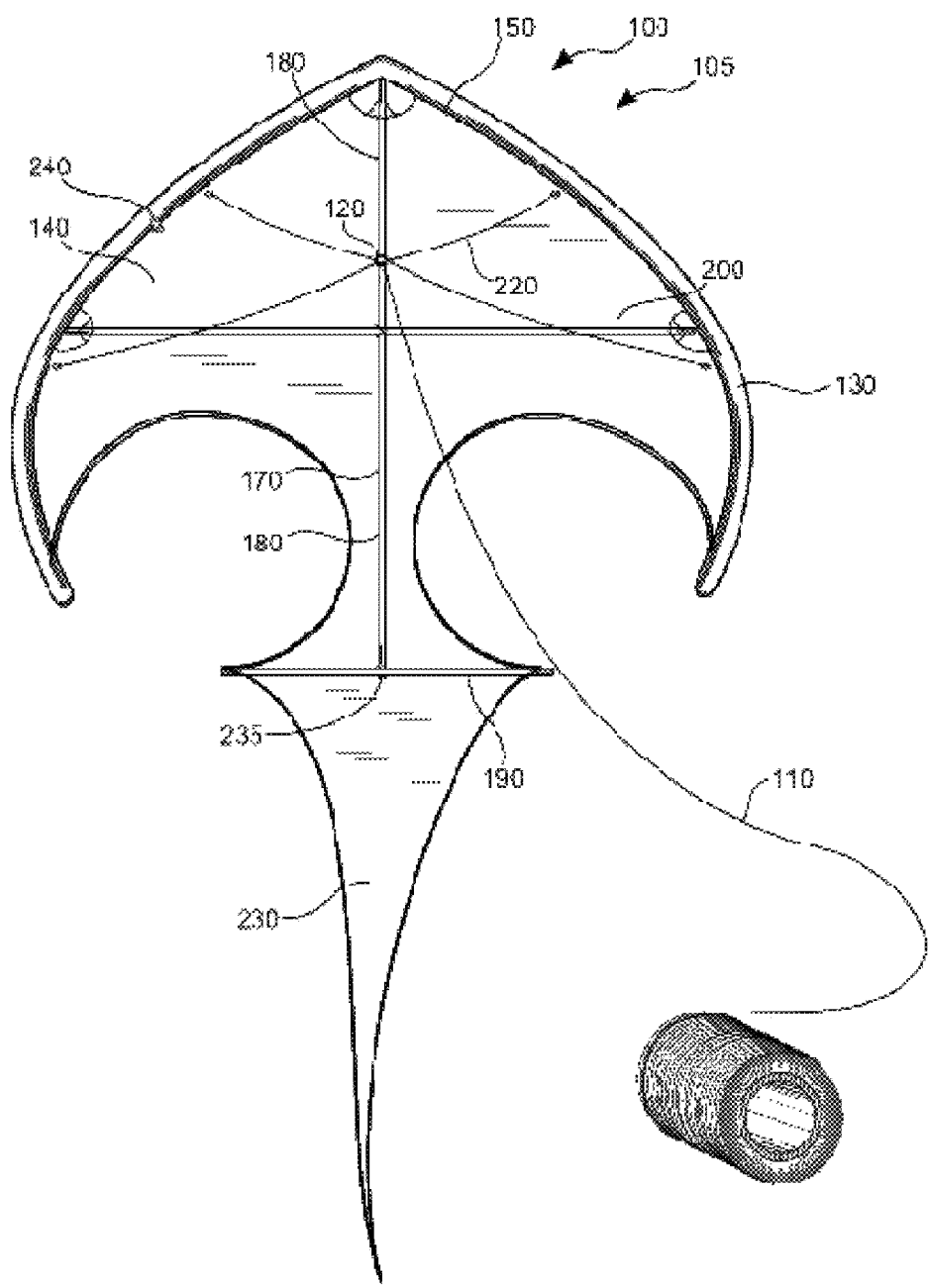
FIG. 4 is a perspective view illustrating a second embodiment of the helium assisted kite system according to an embodiment of the present invention of FIG. 1.

Referring now to FIG. 4, showing a perspective view illustrating tubular gas chamber 130 of helium assisted kite system 100 according to an embodiment of the present invention of FIG. 1.

Tubular gas chamber 130 has an inner volume that is an inflatable channel sufficiently sized to contain enough helium to overcome the gravitational pull and promote a lifting action upon kite assembly 105. Tubular gas chamber 130 may be of a suitable cross-sectional diameter to contain enough Helium to float kite assembly in still air. Tubular gas chamber 130 functions not only as a lifting means, but in some embodiments, may also function as perimeter rail 210. Tubular gas chamber 130 may also function as frame 170 or part of frame 170 in some embodiments, such as spine 180, top spreader 200, bottom spreader 190, or perimeter rail 210 depending on the size and shape of cover fabric 140. Larger embodiments preferably use the full frame 170. Kite assembly 105 comprises light weight materials such that the diameter of tubular gas chamber 130 is able to be comparatively small to cover fabric 140 and frame 170 so that the image of kite assembly 105 is able to be maintained.

Tubular gas chamber 130 has fill-valve 240 that is structured to fill tubular gas chamber 130 with helium via fill-valve 240 to render kite assembly 105 lighter than air. Fill-valve 240 is able to confine the helium within tubular gas chamber 130 and alternately to exhaust the helium from tubular gas chamber 130 quickly when a completely collapsed condition is desired for storage.

Helium assisted kite system 100 may be sold as kit 450 comprising the following parts: at least one cover fabric 140 having a plurality of nocks 160 and tubular gas chamber 130; at least one frame 170 comprising spine 180, top spreader 200, and bottom spreader 190; at least one tail 230; at least one bridle 220 having tow point 120; at least one spool of flight string 110; and at least one set of assembly instructions. The kit has instructions such that functional relationships are detailed in relation to the structure of the invention (such that the invention can be used, maintained, or the like in a preferred manner). Helium assisted kite system 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different shape combinations, parts may be sold separately, etc., may be sufficient.

Figure 5:
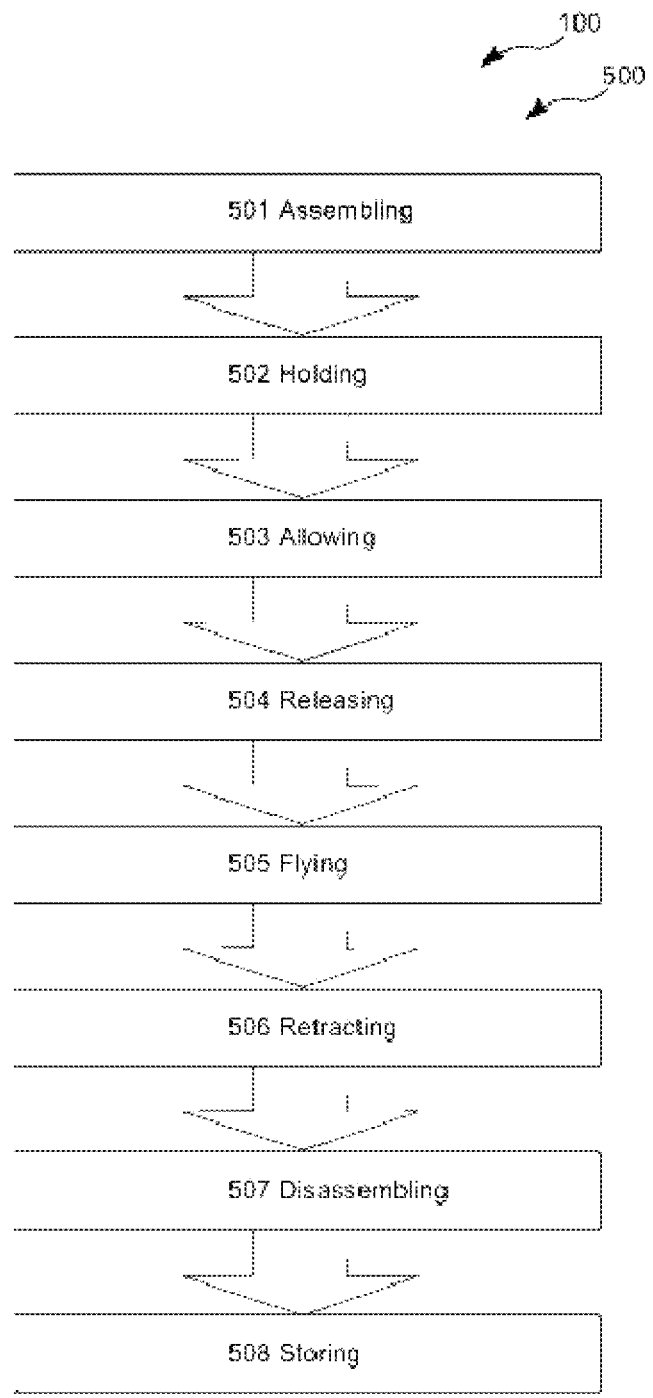
FIG. 5 is a flowchart illustrating a method of use for the helium assisted kite system according to an embodiment of the present invention of FIGS. 1-4.

Referring now to FIG. 5, showing method of use 500 for helium assisted kite system 100. A method of using (method of use 500) helium assisted kite system 100 may comprise the steps of step one 501 assembling kite assembly 105; step two 502 holding kite assembly 105 upward at arm's length in the outside air; step three 503 allowing kite assembly 105 to rise via the helium filled tubular gas chamber 130 into the wind; step four 504 releasing slack on the spool of flight string 110 to gain a desired kite assembly 105 elevation; step five 505 flying kite assembly 105; step six 506 retracting kite assembly 105 via flight string 110; step seven 507 disassembling kite assembly 105; step eight 508 and storing kite assembly 105.

It should be noted that step 501 is an optional step and may not be implemented in all cases. Optional steps of method 500 are illustrated using dotted lines in FIG. 5 so as to distinguish them from the other steps of method 500.

It should be noted that the steps described in the method of use can be carried out in many different orders according to user preference. The use of "step of" should not be interpreted as "step for", in the claims herein and is not intended to invoke the provisions of 35 U.S.C. §112, ¶6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A helium assisted kite system comprising:
   a kite assembly comprising;
      a cover fabric having a plurality of nocks;
      a tubular gas chamber;
      a frame comprising;
         a spine;
         a bottom spreader;
         a top spreader; and
         a perimeter rail;
      a bridle having a tow point;
      a tail; and
      a flight string;
   wherein a length, a width and a height of said kite assembly is defined by said frame and said cover fabric;
   wherein said cover fabric envelopes and attaches to said frame, said frame providing rigidity to said cover such that said cover remains in a stretched planar position in a ready for use condition;
   wherein said bottom spreader is deposed parallel to said top spreader and said spine is deposed perpendicular to said bottom spreader and said top spreader;
   wherein said perimeter rail is attached about a perimeter of said cover fabric and structured and arranged to provide a shape for said cover fabric in said stretched planar position;
   wherein said tubular gas chamber is non-removably attached about a perimeter of said cover fabric such that said tubular gas chamber comprises substantially a same shape as said cover fabric in said stretched planar position;
   wherein said tubular gas chamber comprises an inflatable gas channel;
   wherein said plurality of nocks are attached to and structured and arranged about said perimeter of said cover fabric such that said spine, said bottom spreader, said top spreader, and said perimeter rail are able to be attached to said cover fabric in said stretched planar position via said plurality of nocks;
   wherein said tow point of said bridle is located at a center of said bridle and comprises a point for attaching said flight string;
   wherein said bridle is attached to at least two perimeter edges of said kite assembly such that a flight of said kite assembly is able to remain substantially in a user preferred position as controlled;
   wherein said tail of said kite assembly is located at a bottom end of said kite assembly and is able to provide flight stabilization for said kite assembly; and
   wherein said kite assembly is useful for attaching said flight string to said tow point and allowing helium to fill said tubular gas chamber to lift said kite assembly upward above a ground surface into a high elevation wind on a windless day at said ground surface.

2. The helium assisted kite system of claim 1 wherein said tubular gas chamber further comprises a fill-valve such that said tubular gas chamber is structured and arranged to be filled with said helium via said fill-valve to render said kite assembly lighter than air.

3. The helium assisted kite system of claim 2 wherein said fill-valve is able to confine said helium within said tubular gas chamber and alternately to exhaust said helium from said tubular gas chamber at a user-preferred time.

4. The helium assisted kite system of claim 1 wherein said tubular gas chamber forms a full perimeter border for said cover fabric.

5. The helium assisted kite system of claim 4 wherein said tubular gas chamber comprises a non-permeable fabric.

6. The helium assisted kite system of claim 1 wherein said tubular gas chamber comprises an inner volume, said inner volume able to contain sufficient helium to overcome a gravitational pull on said kite assembly to promote a lifting action upon said kite assembly.

7. The helium assisted kite system of claim 1 wherein said kite assembly comprises light weight materials such that a diameter of said tubular gas chamber is able to be comparatively small to said cover fabric and said frame.

8. The helium assisted kite system of claim 1 wherein said tubular gas chamber is structured and arranged to function as a perimeter rail and a lifting means.

9. The helium assisted kite system of claim 1 wherein said kite assembly is structured to rise into an atmosphere via said helium filled said tubular gas chamber.

10. The helium assisted kite system of claim 9 wherein said flight string comprises a tether between said kite assembly and said user such that said kite assembly is able to be lifted into said atmosphere to a user preferred height.

11. The helium assisted kite system of claim 1 wherein said spine of said frame is positioned vertically on said assembled said kite assembly during flight.

12. The helium assisted kite system of claim 1 wherein said tail of said kite assembly is attached to a lowermost end of said spine.

13. The helium assisted kite system of claim 12 wherein said tail of said kite assembly is integral with said cover fabric.

14. The helium assisted kite system of claim 1 wherein said border of said kite assembly comprises a sleeve that is structured to receive said perimeter rail.

15. The helium assisted kite system of claim 14 wherein said perimeter rail is semi-rigid.

16. The helium assisted kite system of claim 1 wherein said spine, said bottom spreader, and said top spreader each further comprise ends that are structured to be inserted into said plurality of nocks to provide rigidity to said cover fabric.

17. The helium assisted kite system of claim 1 further comprising a kit including:
- at least one said cover fabric having said plurality of nocks and said tubular gas chamber;
- at least one said frame comprising said spine, said top spreader, said bottom spreader, and said perimeter rail;
- at least one said tail;
- at least one said bridle having said tow point;
- at least one spool of said flight string; and
- at least one set of assembly instructions.

18. A helium assisted kite system comprising:
a kite assembly comprising;
- a cover fabric having a plurality of nocks;
- a tubular gas chamber;
- a frame comprising;
  - a spine;
  - a bottom spreader;
  - a top spreader; and
  - a perimeter rail;
- a bridle having a tow point;
- a tail; and
- a flight string;
- wherein said kite assembly is structured to rise into an atmosphere via said tubular gas chamber filled with helium;
- wherein a length, a width and a height of said kite assembly is defined by said said frame and said cover fabric;
- wherein said cover fabric envelopes and attaches to said frame, said frame providing rigidity to said cover such that said cover remains in a stretched planar position in a ready for use condition;
- wherein said bottom spreader is deposed parallel to said top spreader and said spine is deposed perpendicular to said bottom spreader and said top spreader;
- wherein said spine of said frame is positioned vertically on said assembled said kite assembly during flight;
- wherein said perimeter rail is attached about a perimeter of said cover fabric and structured and arranged to provide a shape for said cover fabric in said stretched planar position;
- wherein said border of said kite assembly comprises a sleeve that is structured to receive said perimeter rail;
- wherein said perimeter rail is semi-rigid;
- wherein said tubular gas chamber is non-removably attached about a perimeter of said cover fabric such that said tubular gas chamber comprises substantially a same shape as said cover fabric in said stretched planar position;
- wherein said tubular gas chamber forms a full perimeter border for said cover fabric;
- wherein said tubular gas chamber comprises a non-permeable fabric;
- wherein said tubular gas chamber is structured and arranged to function as a perimeter rail and a lifting means;
- wherein said tubular gas chamber comprises an inflatable gas channel;
- wherein said tubular gas chamber comprises an inner volume, said inner volume able to contain sufficient helium to overcome a gravitational pull on said kite assembly to promote a lifting action upon said kite assembly;
- wherein said kite assembly comprises light weight materials such that a diameter of said tubular gas chamber is able to be comparatively small to said cover fabric and said frame;
- wherein said tubular gas chamber further comprises a fill-valve such that said tubular gas chamber is structured and arranged to be filled with said helium via said fill-valve to render said kite assembly lighter than air;
- wherein said fill-valve is able to confine said helium within said tubular gas chamber and alternately to exhaust said helium from said tubular gas chamber at a user-preferred time;
- wherein said plurality of nocks are attached to and structured and arranged about said perimeter of said cover fabric such that said spine, said bottom spreader, said top spreader, and said perimeter rail are able to be attached to said cover fabric in said stretched planar position via said plurality of nocks;
- wherein said spine, said bottom spreader, and said top spreader each further comprise ends that are structured to be inserted into said plurality of nocks to provide rigidity to said cover fabric;
- wherein said tow point of said bridle is located at a center of said bridle and comprises a point for attaching said flight string;
- wherein said flight string comprises a tether between said kite assembly and said user such that said kite assembly is able to be lifted into said atmosphere to a user preferred height;
- wherein said bridle is attached to at least two perimeter edges of said kite assembly such that a flight of said kite assembly is able to remain substantially in a user preferred position as controlled;
- wherein said tail of said kite assembly is located at a bottom end of said kite assembly and is able to provide flight stabilization for said kite assembly;
- wherein said tail of said kite assembly is attached to a lowermost end of said spine;
- wherein said tail of said kite assembly is integral with said cover fabric; and
- wherein said kite assembly is useful for attaching said flight string to said tow point and allowing helium to fill said tubular gas chamber to lift said kite assembly upward above a ground surface into a high elevation wind on a windless day at said ground surface.

* * * * *